US012804738B2

(12) United States Patent
Li et al.

(10) Patent No.: US 12,804,738 B2
(45) Date of Patent: Nov. 17, 2026

(54) METHOD AND APPARATUS FOR SUBNETWORK CONFIGURATION AND PROCEDURES

(71) Applicant: Nokia Technologies Oy, Espoo (FI)

(72) Inventors: Dong Li, Shanghai (CN); Tao Tao, Shanghai (CN); Pingping Wen, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 214 days.

(21) Appl. No.: 18/834,819

(22) PCT Filed: Feb. 17, 2022

(86) PCT No.: PCT/CN2022/076661
§ 371 (c)(1),
(2) Date: Jul. 31, 2024

(87) PCT Pub. No.: WO2023/155100
PCT Pub. Date: Aug. 24, 2023

(65) Prior Publication Data
US 2025/0150949 A1 May 8, 2025

(51) Int. Cl.
*H04L 61/10* (2022.01)
*H04L 61/5038* (2022.01)
(Continued)

(52) U.S. Cl.
CPC ............. *H04W 76/11* (2018.02); *H04L 61/10* (2013.01); *H04L 61/5038* (2022.05);
(Continued)

(58) Field of Classification Search
CPC . H04L 61/09–59; H04L 2101/30–695; H04W 4/30–80; H04W 8/18–28;
(Continued)

(56) References Cited

U.S. PATENT DOCUMENTS 5,740,160 A 4/1998 Ikegami et al.
7,173,922 B2 * 2/2007 Beach .................. H04W 84/12
(Continued)

FOREIGN PATENT DOCUMENTS

CN 105188104 A * 12/2015 ............ H04W 40/24
CN 109275151 A 1/2019
CN 112640502 A 4/2021

OTHER PUBLICATIONS

Extended European Search Report received for corresponding European Patent Application No. 22926434.6, dated Aug. 20, 2025, 17 pages.

(Continued)

*Primary Examiner* — Timothy J Weidner
(74) *Attorney, Agent, or Firm* — Robert P. Michal, Esq.; Rimon PC

(57) ABSTRACT

Methods and apparatus are disclosed for subnetwork operations. A method comprises, obtaining at an apparatus, a radio network identity which identifies the apparatus as a wireless communication device within a radio network; obtaining a physical layer subnet-work identity, PSI, at least based on the obtained radio network identity; and generating one or more subnetwork signals based on the obtained PSI, wherein the one or more subnetwork signals are used for intra-subnetwork communication within a subnetwork of the radio network.

8 Claims, 6 Drawing Sheets

300

(51) Int. Cl.

| | |
|---|---|
| ***H04L 101/681*** | (2022.01) |
| ***H04L 101/695*** | (2022.01) |
| ***H04W 8/26*** | (2009.01) |
| ***H04W 24/02*** | (2009.01) |
| ***H04W 28/18*** | (2009.01) |
| ***H04W 48/16*** | (2009.01) |
| ***H04W 76/11*** | (2018.01) |
| ***H04W 84/04*** | (2009.01) |
| ***H04W 84/12*** | (2009.01) |
| ***H04W 88/02*** | (2009.01) |
| ***H04W 88/08*** | (2009.01) |
| ***H04W 88/12*** | (2009.01) |
| ***H04W 92/02*** | (2009.01) |
| ***H04W 92/10*** | (2009.01) |
| ***H04W 92/12*** | (2009.01) |

(52) U.S. Cl.

CPC ............ *H04W 8/26* (2013.01); *H04W 24/02* (2013.01); *H04W 28/18* (2013.01); *H04W 48/16* (2013.01); *H04L 2101/681* (2022.05); *H04L 2101/695* (2022.05); *H04W 84/042* (2013.01); *H04W 84/12* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01)

(58) Field of Classification Search

CPC ..... H04W 24/02–04; H04W 28/16–26; H04W 48/02–20; H04W 56/001–0025; H04W 76/10–50; H04W 84/005–22; H04W 88/005–188; H04W 92/02–24

See application file for complete search history.

(56) References Cited

U.S. PATENT DOCUMENTS

| | | | |
|---|---|---|---|
| 9,021,067 | B2 | 4/2015 | Wimmer |
| 9,374,704 | B2 | 6/2016 | Chen et al. |
| 2010/0041387 | A1 | 2/2010 | Khetawat et al. |
| 2013/0182586 | A1 | 7/2013 | Paladugu et al. |
| 2014/0355483 | A1 | 12/2014 | Jang et al. |
| 2020/0275348 | A1 | 8/2020 | Park et al. |
| 2021/0289383 | A1 | 9/2021 | Marinier et al. |
| 2021/0377919 | A1 | 12/2021 | Fong et al. |

OTHER PUBLICATIONS

Office action received for corresponding Indian Patent Application No. 202417056542, dated Jun. 1, 2026, 7 pages.

Berardinelli et al., “Extreme Communication in 6G: Vision and Challenges for ‘in-X’ Subnetworks”, IEEE Open Journal of the Communications Society, vol. 02, Oct. 26, 2021, pp. 2516-2535.

Adeogun et al., “Distributed Dynamic Channel Allocation in 6G in-X Subnetworks for Industrial Automation”, IEEE Globecom Workshops (GC Wkshps), Dec. 7-11, 2020, 6 pages.

International Search Report and Written Opinion received for corresponding Patent Cooperation Treaty Application No. PCT/CN2022/076661, dated Apr. 28, 2022, 10 pages.

* cited by examiner

METHOD AND APPARATUS FOR SUBNETWORK CONFIGURATION AND PROCEDURES

RELATED APPLICATION

This application was originally filed as PCT Application No. PCT/CN2022/076661 on 17 Feb. 2022, the contents of which are incorporated herein by reference in their entirety.

TECHNICAL FIELD

Embodiments of the disclosure generally relate to wireless communication, and more particularly, to methods and apparatus for subnetwork configuration and procedures to enable subnetwork operations in a radio network.

BACKGROUND

A radio network, e.g., the fifth generation technology standard for broadband cellular networks (5G) or the sixth generation technology standard for broadband cellular networks (6G) radio access technology, is expected to support extreme communication requirements in terms of throughput, latency and/or reliability, which can only be achieved by providing capillary wireless coverage. "In—X" subnetwork is a promising 6G component to fulfil the extreme communication requirements. The in-X subnetworks may be installed in specific entities e.g., a vehicle, a human body, a house, etc., to provide life-critical data service with extreme performances over a local capillary coverage. The "X" stands for an entity in which a subnetwork is deployed, e.g., a vehicle, a human body, a house for "in-vehicle", "in-body", "in-house", respectively.

But the in-X subnetworks are still in its infancy and many technical problems need to be addressed.

SUMMARY

This summary is provided to introduce simplified concepts of subnetwork configuration and procedures to enable subnetwork operations, particularly on subnetwork identities. This summary is not intended to identify key features or essential features of the claimed subject matter, nor is it intended to be used to limit the scope of the claimed subject matter.

According to a first aspect of the disclosure, there is provided a first apparatus. The first apparatus comprises at least one processor, and at least one memory storing computer program code, wherein when executed on the one or more processors, the computer program codes cause the first apparatus to obtain a radio network identity which identifies the apparatus as a wireless communication device within a radio network; obtain a physical layer subnetwork identity, PSI, at least based on the obtained radio network identity; and generate one or more subnetwork signals based on the obtained PSI, wherein the one or more subnetwork signals are used for intra-subnetwork communications within a subnetwork of the radio network.

According to a second aspect of the disclosure, there is provided a second apparatus. The second apparatus comprises at least one processor, and at least one memory storing computer program code, wherein when executed on the one or more processors, the computer program codes cause the second apparatus to receive a first configuration information from a radio network, wherein the first configuration information comprises mapping information of a mapping between a set of physical layer subnetwork identities, PSIs, and a set of radio network identities for one or more subnetworks in the radio network; and detect a synchronization signal, SS, and/or a physical broadcast channel, PBCH, for a subnetwork of the radio network at least based on the first configuration information, wherein the subnetwork is identified with a PSI which belongs to the set of PSIs.

According to a third aspect of the disclosure, there is provided a third apparatus. The third apparatus comprises at least one processor, and at least one memory storing computer program code, wherein when executed on the one or more processors, the computer program codes cause the third apparatus to determine a set of radio network identities, wherein the set of radio network identities comprises one or more identities dedicated to one or more subnetworks in a radio network; assign a radio network identity of the set of radio network identities to a wireless communication device; and transmit the assigned radio network identity to the wireless communication device.

According to a fourth aspect of the disclosure, there is provided a method. The method comprises: obtaining at a first apparatus, a radio network identity which identifies the first apparatus as a wireless communication device within a radio network; obtaining a physical layer subnetwork identity, PSI, at least based on the obtained radio network identity; and generating one or more subnetwork signals based on the obtained PSI, wherein the one or more subnetwork signals are used for intra-subnetwork communication within a subnetwork of the radio network.

According to fifth aspect of the disclosure, there is provided a method. The method comprises: receiving a first configuration information from a radio network, wherein the first configuration information comprises mapping information of a mapping between a set of physical layer subnetwork identities, PSIs, and a set of radio network identities for one or more subnetworks in the radio network; and detecting a synchronization signal, SS, and/or a physical broadcast channel, PBCH, for a subnetwork of the radio network at least based on the first configuration information, wherein the subnetwork is identified with a PSI which belongs to the set of PSIs.

According to sixth aspect of the disclosure, there is provide a method performed. The method comprises: determining a set of radio network identities, wherein the set of radio network identities comprises one or more identities dedicated to one or more subnetworks in a radio network; assigning a radio network identity of the set of radio network identities to a wireless communication device; and transmitting the assigned radio network identity to the wireless communication device.

According to seventh aspect of the present disclosure, it is provided a computer readable storage medium, on which instructions are stored, when executed by at least one processor, the instructions cause the at least one processor to perform any method according to the fourth, fifth and/or sixth aspects.

According to eighth aspect of the present disclosure, it is provided computer program product comprising instructions which when executed by at least one processor, cause the at least one processor to perform any method according to the first, second and/or third aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings in which.

DETAILED DESCRIPTION

Figure 1:
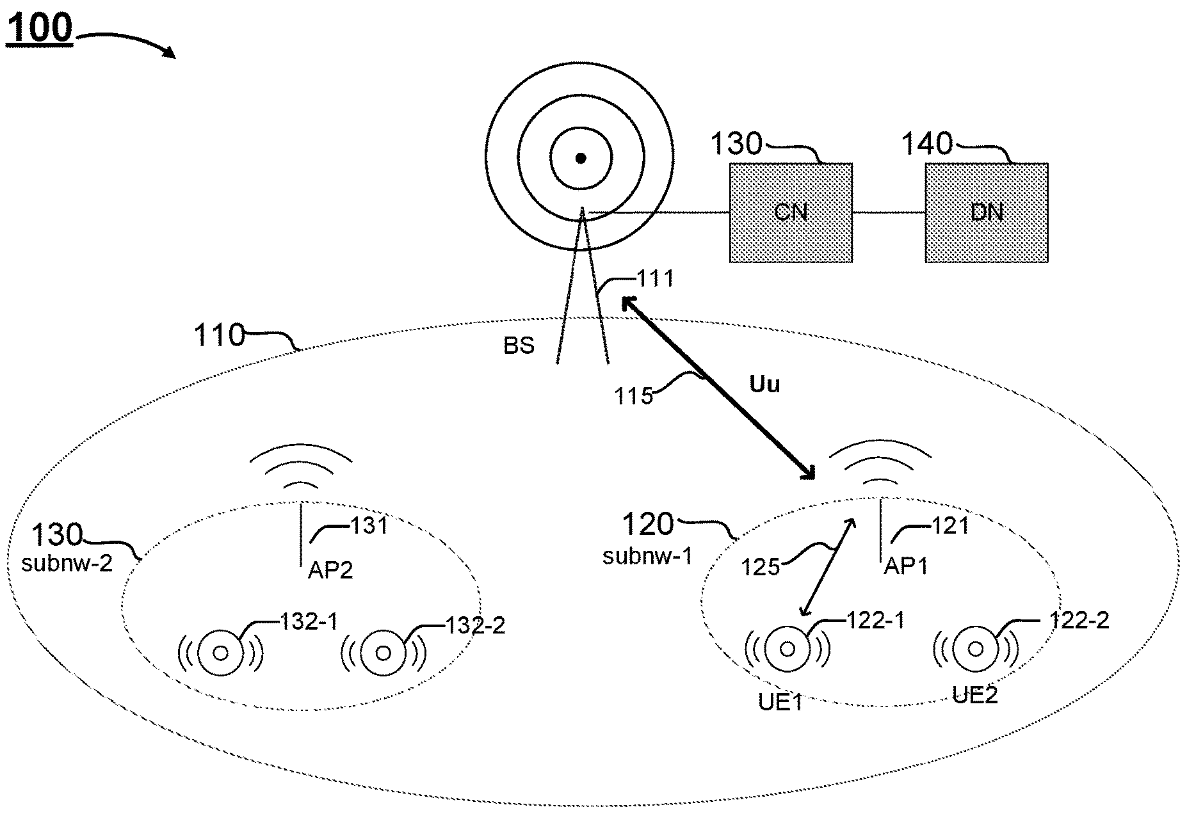
FIG. 1 illustrates an exemplary deployment of in-X subnetworks in which embodiments of the present disclosure can be implemented.

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

In the following description and claims, unless defined otherwise, all technical and scientific terms used herein have the same meaning as commonly understood by one of ordinary skills in the art to which this disclosure belongs.

References in the present disclosure to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, 5G, the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As mentioned above, in a radio network such as 5G or 6G communication network, subnetworks (such as in-X subnetwork) which provides capillary wireless coverage may be supported, to fulfil the extreme communication requirements. FIG. 1 illustrates an exemplary deployment 100 of in-X subnetworks in which embodiments of the present disclosure can be implemented.

As shown in FIG. 1, the deployment 100 comprises a base station 111 which serves a radio access network 110. The deployment 100 further comprises a core network (CN) 130 and a data network (DN) 140. The radio access network 110 comprises an in-X subnetwork 120 (denoted as subnw-1) and an in-X subnetwork 130 (denoted as subnw-2). These in-X subnetworks act as parts of the radio access network 110.

An in-X subnetwork comprises one in-X subnetwork controller and one or more in-X devices (e.g., UEs) which are associated with the in-X subnetwork controller. The subnetwork controller may also be called access point (AP) which is shown in FIG. 1. As shown in FIG. 1 for example, the in-X subnetwork 120 comprises a single AP 121 (denoted as AP1) and two in-X devices 122-1, 122-2 (denoted as UE1, UE2, respectively). These in-X devices may be collectively referred to as 122. In an example, AP1 may be a wireless communication device installed on a vehicle, while UE1 and UE2 may be wireless sensors/actuators installed on the vehicle. Other in-X subnetwork 130 may have a similar structure as the in-X subnetwork 120. In an example, the in-X subnetwork 130 may be on another vehicle.

In the general considerations of the concept of in-X subnetwork, in-X AP may access the radio access network 110, e.g., via a Uu interface through a radio link 115, to perform some operations on behalf of the entire subnetwork (e.g., subnetwork registration, authentication/authorization, parameter/policy configurations for the subnetwork and so on).

BS 111 may be a based station serving the radio access network 110. In this respect, the in-X AP behaves as a user equipment (UE) from the perspective of the radio access network 110, and can access the wide area network (e.g., via a core network (CN) 130 and a data network (DN) 140) for traffic/control transmissions with medium or non-critical flows. In particular, the in-X AP can realize functions such as device-to-network relaying between the in-X devices and the radio access network 110.

Each of these in-X subnetworks has a hierarchical structure where a single in-X AP controls the operations of the connected in-X devices. Within an in-X subnetwork, an in-X AP controls and coordinates transmissions to/from/between the in-X devices. In this procedure, the in-X AP behaves somewhat like a (special) base station BS in perspective of the in-X devices.

The in-X AP has dual role as a UE (in view of the larger network) and a controller (in view of in-X devices). For example, the AP1 can collect data and information from UE1 and UE2 and then forward the collected data and information to BS 111, so that the data and information can be shared to the outside world and processed in the central cloud. Also, the AP1 can receive measurements from the UE1, which are processed by the controller, and issues commands to the UE2. These high critical measurement data are therefore kept within the in-X subnetwork, as the tight latency requirement does not allow for external processing.

The in-X AP 121, 131 and in-X device 122, 132 may be embodied as any suitable wireless communication device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator, and other devices capable of wireless communication. The BS 111 may be embodied as any suitable base station supporting a radio access network, for example, a gNode B (gNB) or a wireless access point. Each base station defines a coverage area of a radio access network.

It is to be understood that the network deployment 100 of subnetworks is shown only for purpose of illustration, without suggesting any limitation to the scope of the present disclosure. Embodiments of the present disclosure may also be applied to an environment with a different structure. In this regard, it is to be appreciated that, although there are two in-X subnetworks in the radio access network 110 shown in FIG. 1, the radio access network 110 may comprise one or more in-X subnetworks. Although there are two in-X devices in an in-X subnetwork shown in FIG. 1, an in-X subnetwork may comprise one or more in-X devices. It is to be also appreciated that embodiments of the present disclosure may also be implemented for other kinds of subnetworks. Besides in-X subnetwork, various subnetworks in which embodiments of the present disclosure can be applied are collectively referred to as subnetworks, hereinafter.

As mentioned above, such kinds of subnetworks are a capillary wireless coverage of a larger communication network to fulfil the extreme performance requirements in term of latency, reliability and/or throughput. Generally, the subnetworks have the following pivotal properties and technical features:

1) Support of extreme performance requirements, in terms of latency, reliability and/or throughputs, etc. . . . .
2) Low transmit power in both uplink (UL) and downlink (DL), which implies limited coverage range (e.g., in several meters).
3) Star or tree topology. A subnetwork consists of one control node (such as in-X AP) and one or more UEs (such as in-X devices). The control node controls operations of the UEs.
4) Overall mobility of control node and associated UEs and lack of mobility across different subnetworks. Due to the nature of the deployments, each UEs (such as in-X devices) can only be connected to a single control node (such as in-X AP) for the entire operation time. Subnetworks can however be mobile. For example, an in-vehicle subnetwork installed in a vehicle may move around along with the vehicle. An in-vehicle AP and in-vehicle sensors would move around as a whole. Meanwhile, one in-vehicle sensor in a subnetwork would not move and joint to another subnetwork.
5) As part of overlay wide area network (WAN) network but can continue to work out of network coverage. The WAN network is a larger network which serves one or more subnetwork. For example, as shown in FIG. 1, in-X subnetworks 120 and 130 act as parts of the radio access network 100. The larger network may be any other type of communication networks, such as a Long Term Evolution (LTE) or LTE-Advanced (LTE-A) network, 5G radio access network, 6G radio access network, or any other networks supporting mobile communication of one or more subnetworks within its coverage area.

Generally, the system designs for subnetwork shall take the above technical features into account.

In order to support operations in a subnetwork, each subnetwork shall have its own subnetwork identity, which is used to differentiate from other subnetworks in its near area, for example, in terms of synchronization signals, reference signals, scrambling sequences and so on e.g., for interference averaging and suppression.

One technical challenge of subnetwork identity configuration is how to allocate a subnetwork identity for a subnetwork without any identity collision. As the subnetwork may be mobile, there is a potential ID collision issue, where two subnetworks far apart reusing a same ID may move near to each other, thus leading to collision interference and threating the provisioning of the extreme performances in the subnetworks.

Currently, there is no existing scheme to address this technical problem. In a traditional cellular network, physical cell IDs (PCIs) of cellular cells in a coverage area are assigned through network planning and configuration. When the planning is reasonable, it can be ensured that neighbor cells in a coverage area use different PCIs. But the cells far apart may use a same PCI.

The present disclosure proposes a scheme of configuration and procedures to enable subnetwork operations, particularly on subnetwork identities.

In some embodiments, a set of radio network identities is configured to correspond a set of physical layer subnetwork identities (PSIs) for one or more subnetworks. This set PSIs comprises one or more physical layer subnetwork identities to be allocated to one or more subnetworks. The set of radio network identities comprises one or more radio network identities, which can be utilized to identify wireless communication devices within a radio access network. The one or more subnetworks are in a coverage area of the radio access network.

In some embodiments, the set of radio network identities may comprise identities dedicated to the one or more subnetworks.

In some embodiments, a base station may determine a set of radio network identities, wherein the set of radio network identity comprises one or more identities dedicated to one or more subnetworks in a radio network; assign a radio network identity of the set of radio network identity to a wireless communication device; and transmit the assigned radio network identity to the wireless communication device.

In some embodiments, a control node of a subnetwork may obtain a radio network identity which identifies the control node as a wireless communication device within a radio network; obtain a physical layer subnetwork identity, PSI, at least based on the obtained radio network identity; and generate one or more subnetwork signals based on the obtained PSI, wherein the one or more subnetwork signals are used for intra-subnetwork communications within a subnetwork of the radio network.

In some embodiments, a control node of a subnetwork may transmit a message to a base station indicating that it's capable of being a control node of a subnetwork. In some embodiments, in response to this message, procedures for enabling subnetwork operations, such as an allocation of subnetwork identities, may be triggered.

In some embodiments, the radio network or the base station may provide a subnetwork configuration information, wherein the subnetwork configuration information indicates a radio network identity and/or a physical layer subnetwork identity, PSI of a subnetwork to a control node of a subnetwork.

In an example, the set of radio network identities may be a subset of a total radio network temporary identity (RNTI) set/space. In an example, a radio network identity in the set may be allocated to an in-X AP of a subnetwork. Since radio network identities assigned to different in-X APs would be different, PSIs corresponding to the radio network identities for different in-X APs would be different from each other. Accordingly, identity collision between subnetworks in the radio access network would be avoided.

In some embodiments, the configuration and/or allocation of the set of radio network identities may be managed by a base station of the radio access network. For example, the base station may manage a dedicated subset of radio network temporary identities (RNTIs) for one or more subnetworks in the radio network, and allocate an RNTI from the subset to a network controller (such as an in-X AP) of a subnetwork for subnetwork operations.

In an example, once a control node (such as an in-X AP) for a subnetwork accesses the radio access network, the control node is allocated a specific RNTI by the base station from the subset of RNTIs, to identify the AP in the radio access network. In another example, the base station may allocate a specific RNTI to a network controller in other procedure, e.g., in response to receiving a message or a trigger event.

In some embodiments. the base station may further transmit to the AP, related configuration information of mapping relation between the set of radio network identities and the set of PSIs. In an example, the configuration information may be broadcast by the base station as part of subnetwork related system information. In another example, the allocated radio network identity and/or the configuration information may be transmitted to the in-X AP through a dedicated signaling, e.g., dedicated logical channel or MAC control element, CE.

In some embodiments, the set of PSIs may be a default set of identities, e.g., pre-defined or specified in system specifications for subnetwork operations in a radio network. In an example, the base station can determine an identity for an in-X AP from the default PSI set, and notify the determined identity to the in-X AP, for example through a dedicated signaling.

In another example, a control node (such as an in-X AP) for a subnetwork may select a suitable identity from the default PSI set autonomously. For example, the in-X AP can determine an identity from the PSI set via channel sensing and PSI selection to avoid PSI collisions in its near area.

In some embodiments, a control node (such as an in-X AP) for a subnetwork may provide a message to the radio network, which indicates it is capable of being a control node (such as an AP) for the subnetwork. In response, the radio network (e.g., a base station of the radio network) allocates a specific radio network identity from the set of RNTIs dedicated to the subnetworks and indicates it to the control node, from which a PSI may be derived by the control node for the subnetwork. In some embodiments, the radio network may provide a PSI of a subnetwork to the control node responsively.

A control node (such as an in-X AP) for a subnetwork may obtain its PSI based on the obtained radio network identity in any suitable way. In an example, the in-X AP derives its PSI from the allocated RNTI value. The PSI may be obtained/derived further based on the configuration information of mapping relation between the set of radio network identities and the set of PSIs, which may be received from the base station.

In some embodiments, a control node (such as an in-X AP) for a subnetwork may generate one or more subnetwork signals and/or transmit on channels based on the obtained PSI. The one or more subnetwork signals may be used for intra-subnetwork communications within a subnetwork of the radio network.

For example, an in-X AP can trigger routine operations within the subnetwork, e.g., transmitting of synchronization signals (SS)/physical broadcast channel (PBCH), control signal and data transmissions and so on. The synchronization signals and the PBCH may be generated based on the PSI derived by the in-X AP. The demodulation reference signals and the scrambling sequences for the data and/or control channels may also be generated based on the PSI.

As PSIs for subnetworks served by different in-X APs may be different in a same radio access network, the PSI collision can be avoided within the radio access network of a BS coverage, even there are multiple mobile subnetworks in the coverage.

In some embodiments, a device (such as an in-X device) may monitor at least configuration information of the set of radio network identities corresponding to the set of PSIs, which is broadcast by a base station of a radio network. The in-X device may detect a synchronization signal (SS) and/or a physical broadcast channel (PBCH) for a subnetwork of the radio network at least based on the configuration information.

In an example, in a procedure of initial accessing to a subnetwork, an in-X device may search the SS from an in-X AP. Based on the configuration information, the in-X device may be able to determine a space of blind searching for the SS. For example, the in-X device may determine the subset of RNTIs corresponding to the set of PSIs, and search the SS of the subnetwork within a space defined by the subset of RNTIs or the set of PSIs. In this way, the in-X device may speed up the procedure of initial accessing to a subnetwork, improving extreme performance requirements in term of latency.

Figure 2:
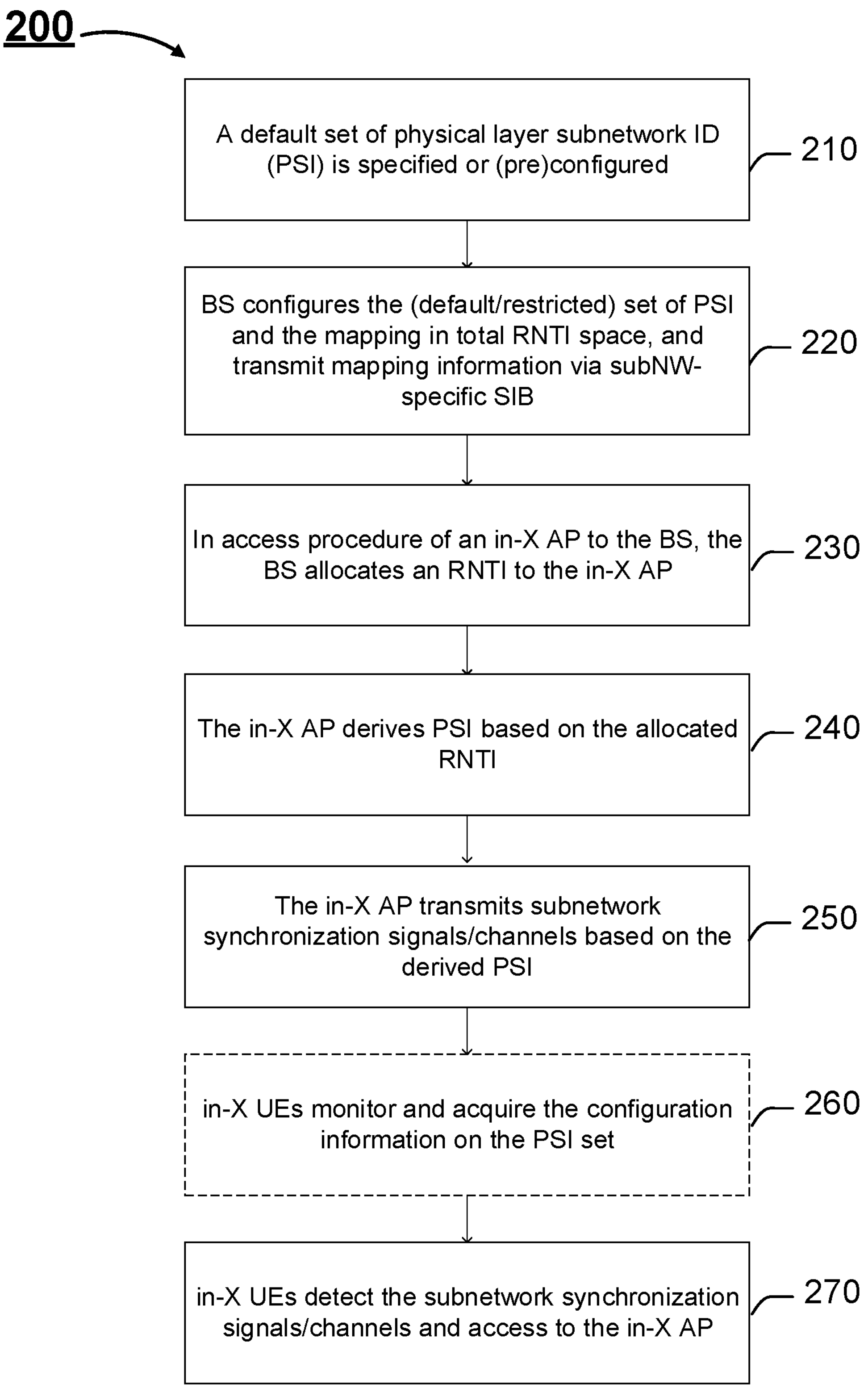
FIG. 2 illustrates an exemplary procedure for subnetwork operations according to embodiments of the present disclosure.

FIG. 2 illustrates an exemplary procedure 200 for subnetwork operations according to embodiments of the present disclosure. This example may be implemented in the in-X subnetworks illustrated in FIG. 1.

In the procedure 200, the physical subnetwork identity (PSI) can be allocated and managed by a base station (such as BS 111) severing a radio access network (such as network 110), that one or more subnetworks can be associated with.

In some embodiments, a default set of PSIs (denoted by $S_{PSI}$) can be specified or pre-configured, as shown at step 210. For example, $S_{PSI}=\{0, 1, 2, \ldots, 1023\}$. The default set of PSIs is known to in-X APs and in-X devices. In a case that a subnetwork is out-of-coverage of a radio access network, an in-X AP of the subnetwork can select a PSI from the default set of PSIs by its own. It should be noted that the (re) selection procedure for PSI in this case is out of scope of this disclosure.

In some embodiments, the base station may configure a default and/or restricted set of PSIs and a mapping between the set of PSIs and a set of radio network identities. The base station may transmit configuration information of the mapping to in-X APs, e.g., via a subnetwork-specific system information block (SIB), as shown at step 220. The default set of PSIs may be configured to comprise sequential identities or discrete identities, e.g., according to available resources of identities in its radio access network. The restricted set of PSIs may be a subset of the default set of PSIs. The restricted set of PSIs may has less identities than the default set of PSIs.

In an example, the default/restricted set of PSIs may correspond to a subset of RNTIs in a total RNTI space. As well-known, RNTI is used as UE identifiers or other specific purposes. According to the present disclosure, a subset of RNTIs may be dedicated to be utilized by subnetworks. The base station provides configuration information which comprises mapping information of the mapping of a set of PSIs within a total set of RNTIs. It is assumed that the total RNTI space has a sufficient size, e.g., at least with a size of 16 bits (e.g., as defined in 3GPP LTE/NR systems), much larger than the size of a default set of PSIs. It means that there are sufficient numbers of candidate RNTI which can be utilized by subnetworks.

Figure 4:
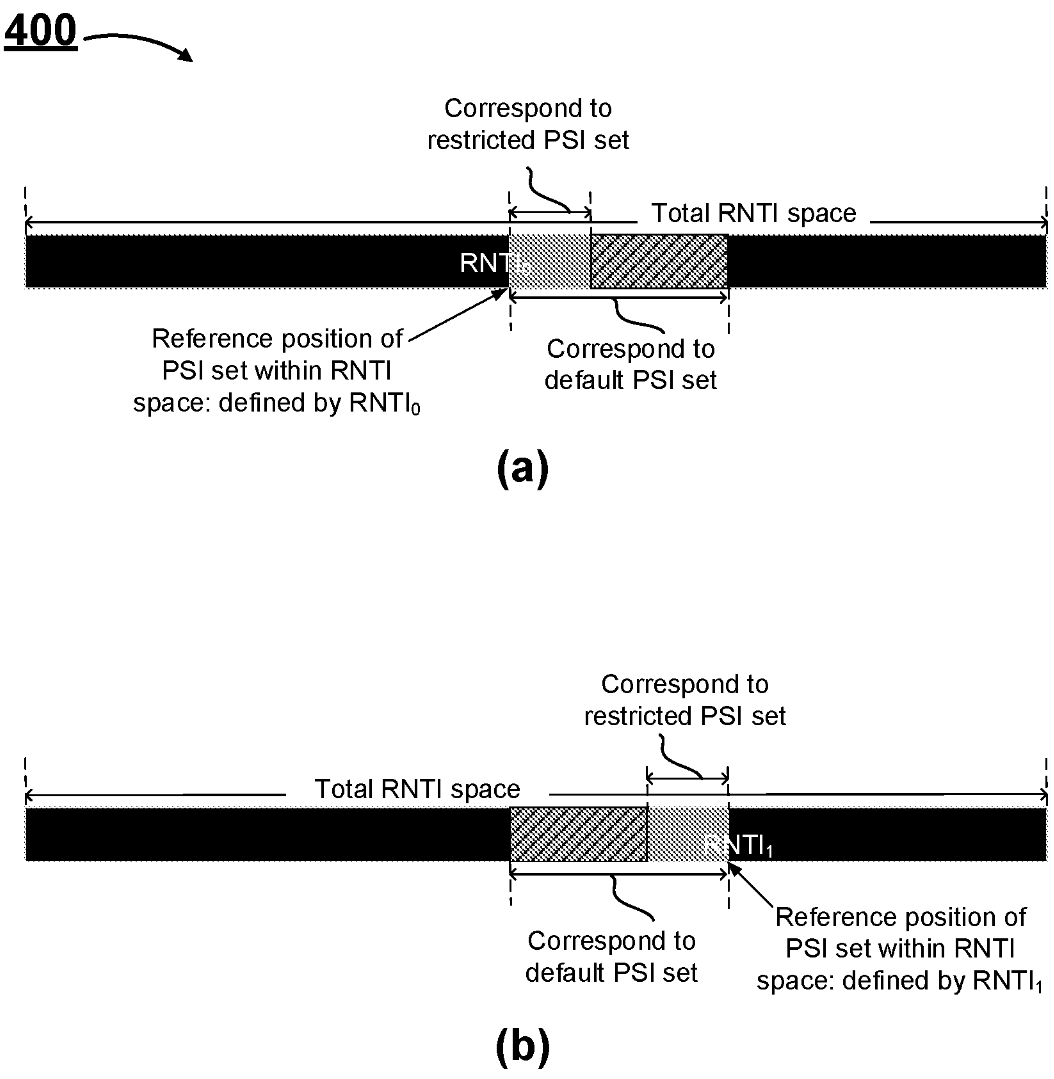
FIG. 4 illustrates a mapping of a default/restricted set of PSIs in a radio network temporary identifier (RNTI) space according to embodiments of the present disclosure.

The subset of RNTIs that corresponds to the default set of PSIs is denoted by $S_{RNTI\_SN}$. In one embodiment, as shown in FIG. 4(*a*), $S_{RNTI\_SN}=S_{PSI}+RNTI_0$, where $RNTI_0$ is a minimum identity in the subset of RNTIs. $RNTI_0$ may indicate a reference position (e.g., starting point) of the set of PSIs within the total RNTI space. $RNTI_0$ may be included in the mapping information.

In another embodiment, as shown in FIG. 4(*b*), $S_{RNTI\_SN}=RNTI_1-S_{PSI}$, where $RNTI_1$ is a maximum identity in the subset of RNTIs. $RNTI_1$ may indicate a reference position (e.g., ending point) of the set of PSIs within the total RNTI space. $RNTI_1$ may be included in the mapping information.

In one embodiment, the mapping information may indicate a number of identities to be allocated for the default set of PSIs. In another embodiment, the number of identities to be allocated for the default set of PSIs may be pre-defined and known by in-X APs.

The subset of RNTIs that corresponds to the restricted set of PSIs is denoted by $S'_{RNTI\_SN}$. The restricted PSI set is denoted as $S'_{PSI}$. The restricted set of PSIs may be a subset of the default set of PSIs, e.g., as shown in FIGS. 4(*a*) and 4(*b*). For example, for specific subnetwork deployments (e.g., in a case that a spatial density of subnetworks within a larger network is low sufficiently), a base station may further configure restriction for the set of PSIs, such that only a subset of the default set of PSIs is used for the subnetworks. In this way, the resources reserved for subnetworks may be optimized, and a searching space for a subnetwork may be narrowed to facilitate a speed-up access to a subnetwork.

The base station may transmit configuration information of mapping between the restricted set of PSIs and the subset of RNTIs, e.g., via a subnetwork-specific broadcast. In an embodiment, a number of identities (denoted as $N_{PSI}$) to be allocated for the restricted PSI set may be included in mapping information in the configuration information.

In one example, a base station transmits $N_{PSI}$ to in-X APs once it determines that a spatial density of subnetworks within a larger network is lower than a threshold. In this case, $RNTI_0$ and/or $RNTI_1$ may also be utilized to indicate a reference position (e.g., starting point/ending point) of the restricted set of PSIs within the total RNTI space, as shown in FIGS. 4(*a*) and 4(*b*).

In another example, a base station transmits $N_{PSI}$ together with the configuration information for the default set of PSIs. In this case, the restricted set of PSIs may be enabled or disabled according to certain trigger conditions. For example, the base station may transmit to in-X APs a notification indicating the restricted set of PSIs is enabled. Without receiving this notification, in-X APs would ignore the $N_{PSI}$ and use the default set of PSIs.

As shown at step 230, in an initial access procedure of an in-X AP (e.g., AP1 121) to the base station (and to a core network 130), the base station may allocate an RNTI, denoted as $RNTI_{SN}$, to the in-X AP from the set $S_{RNTI\_SN}$ (or $S'_{RNTI\_SN}$). For example, the allocated $RNTI_{SN}$ may be similar to a C-RNTI (Cell-RNTI) as defined in LTE/NR systems.

In an embodiment, the in-X AP may transmit a message to the BS indicating that it's capable of being a control node of a subnetwork, and the base station may allocate the $RNTI_{SN}$ in response to receiving the message. For example, the in-X AP may transmit a request to the BS for creating a subnetwork. Without receiving the message and/or the request, the base station may treat the in-X AP as a normal communication device. The in-X AP transmits a message to the BS indicating that it's capable of being a control node of a subnetwork may not rely on any other steps previously considering capability can be independently transmitted or indicated to the network.

The in-X AP obtains its PSI (denoted as $PSI_{SN}$) at least based on the allocated RNTI, $RNTI_{SN}$, and configuration information of mapping between the default/restricted set of PSIs and the subset of RNTIs. In an example, $PSI_{SN}$ is derived as $PSI_{SN}=RNTI_{SN}-RNTI_0$, or $PSI_{SN}=RNTI_1-RNTI_{SN}$. In this example, it is assumed that identities in the set of PSIs is consecutive and correspond one-to-one with identities of the subset of RNTIs. However, it should be appreciated that $PSI_{SN}$ is derived in any suitable way, depending on the configuration method for the mapping between the default/restricted set of PSIs and the subset of RNTIs.

Then, as shown at step 250, the in-X AP may start transmitting at least the subnetwork synchronization signals/channels as per the derived PSI.

The in-X devices (such as UE1 122-1, UE2 122-2) to be connected with the in-X AP in the subnetwork may detect subnetwork synchronization signals/channels, and access to the corresponding in-X AP, as shown at step 270. Then, the in-X AP and the in-X devices can perform other relevant operations and intra-subnetwork communications within the subnetwork.

In some embodiments, the in-X devices may optionally monitor and acquire configuration information that are transmitted by the base station, e.g., via SIB, as shown at step 260. It is noted that the step 260 may be performed before the step 250 or step 270. Based on the configuration information, the in-X devices can detect the subnetwork synchronization signals/channels. For example, at least based on one of $RNTI_0$ and $N_{PSI}$, the in-X devices can determine the restricted subset of RNTIs and the restricted set of PSIs. Then, the in-X devices may determine a narrowed space of blind searching for the synchronization signals/channels.

Figure 3:
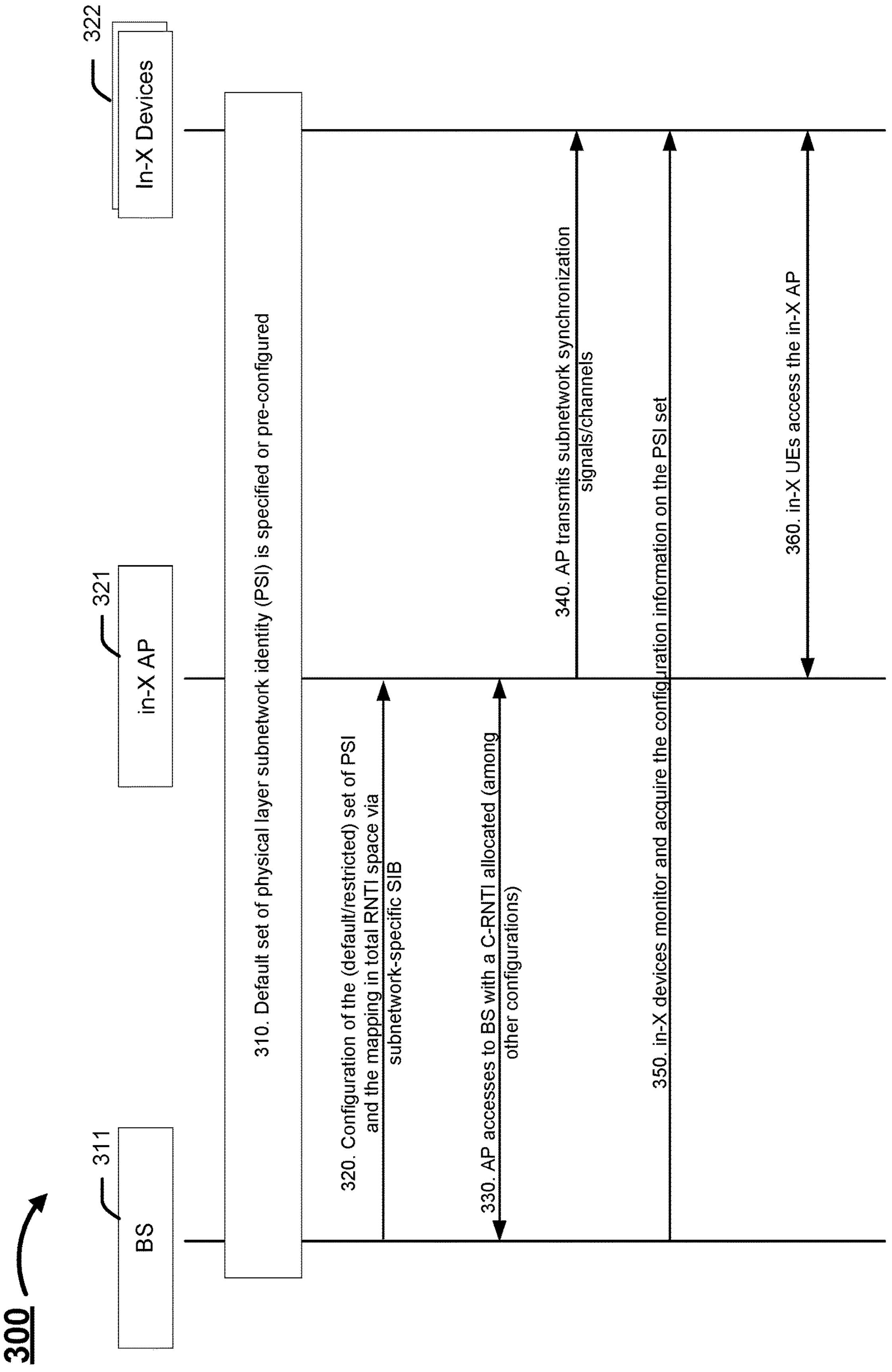
FIG. 3 illustrates an exemplary flowchart for subnetwork operations according to embodiments of the present disclosure.

FIG. 3 illustrates an exemplary flowchart for subnetwork operations according to embodiments of the present disclosure. This exemplary flowchart indicates interactions among related devices in subnetwork operations, and may be implemented in the in-X subnetworks illustrated in FIG. 1. The BS 311 may be implemented in BS 111, the in-X AP may be implemented in AP 121, and the in-X devices may be implemented in UE1 122-1 and UE2 122-2.

At 310, a default set of PSIs may be specified or preconfigured. In this regard, BS 311, in-X AP 321 and in-X devices 322 would have a consistent information about the default set of PSIs. For example, they all know candidate identities in the default set of PSIs, and/or an amount of the candidate identities.

At 320, the BS 311 may transmit configuration information of the default/restricted set of PSIs to the in-X AP 321. The configuration information comprises mapping information of mapping between the default/restricted set of PSIs and a subset of RNTIs for subnetworks. For example, the mapping information indicates the position of the subset of RNTIs in total RNTI space/set. The mapping information may comprise at least one of $RNTI_0$, $RNTI_1$, and $N_{PSI}$. The configuration information may be transmitted via a SIB specific to one or more subnetworks, or be transmitted to in-X AP 321 via a dedicated signaling.

At 330, the in-X AP 321 may access the BS 311 with a C-RNTI (among other configurations) being allocated by the BS 311.

At 340, the in-X AP 321 may transmit the subnetwork synchronization signals/channels by using a PSI derived based on the allocated C-RNTI.

At 350, the in-X devices 322 may monitor and/or acquire configuration information of the default/restricted set of PSIs. For example, the in-X devices 322 may monitor SIB broadcast from the BS 311 to acquire the configuration information, or the in-X devices 322 may acquire the configuration information of the default/restricted set of PSIs through dedicated signaling e.g., radio resource control (RRC) signaling.

At 360, the in-X devices 322 may access the in-X AP 321 and perform intra-subnetwork communications with the in-X AP 321.

Figure 5:
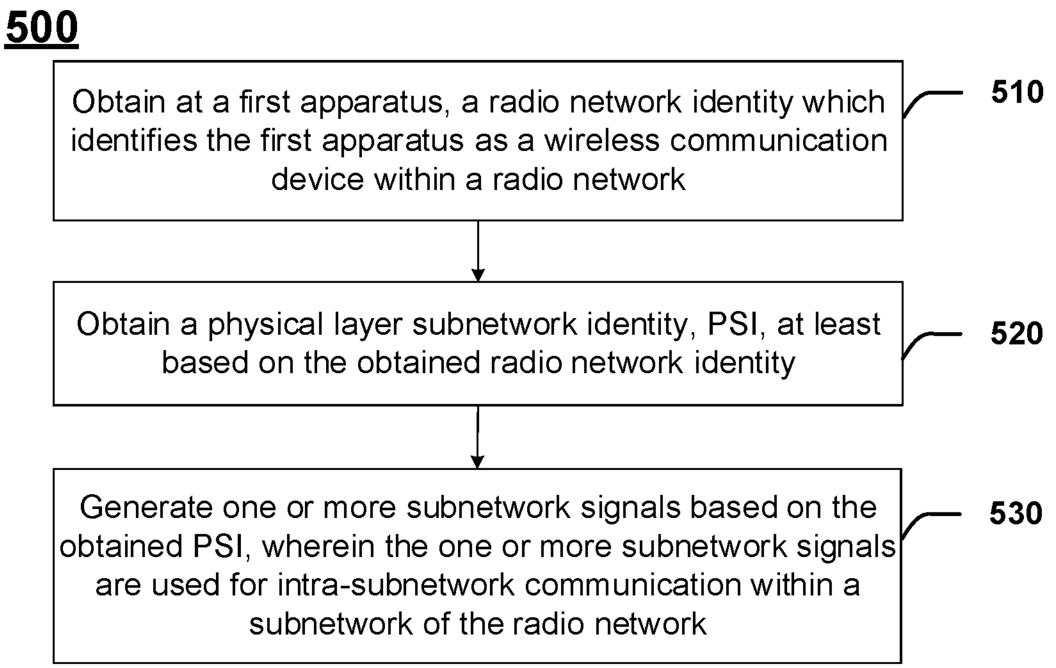
FIG. 5 a flow chart depicting a method according to an embodiment of the present disclosure.

More details of the example embodiments in accordance with the present disclosure will be described with reference to FIG. 5 to FIG. 7. FIG. 5 illustrates a flowchart of a method 500 according to an embodiment of the present disclosure. The method 500 can be implemented at any suitable device. For example, the method 500 can be implemented at a first apparatus, which is configured to implement the in-X AP 121, 321 as shown in FIGS. 1 and 3.

As shown at block 510, a method 500 comprises obtaining a radio network identity which identifies the first apparatus as a wireless communication device within a radio network. At block 520, the method 500 comprises obtaining a physical layer subnetwork identity, PSI, at least based on the obtained radio network identity. At block 530, the method 500 comprises generating one or more subnetwork signals based on the obtained PSI, wherein the one or more subnetwork signals are used for intra-subnetwork communication within a subnetwork of the radio network.

In some embodiments, said obtaining the radio network identity comprises, obtaining the radio network identity from a set of radio network identities, wherein the set of network identity comprises one or more identities dedicated to one or more subnetworks in the radio network.

In some embodiments, the method 500 may further comprise obtaining a first configuration information. The first configuration information comprises mapping information of mapping between a set of PSIs and a set of radio network identities for one or more subnetworks in the radio network. Said obtaining the PSI may comprise obtaining the PSI at least based on the radio network identity and the first configuration information. The mapping information indicates at least one of: a minimum identity (such as $RNTI_0$) in the set of radio network identities, a maximum identity (such as $RNTI_1$) in the set of radio network identities, and a number of identities (such as $N_{PSI}$) to be allocated for the set of PSIs. In some embodiments, the set of PSIs is a default set of PSIs. The obtained PSI belongs to the set of PSIs, and the obtained radio network identity belongs to the set of radio network identities.

In some embodiments, the method 500 may further comprise transmitting a first message to the radio network. The first message indicates that the apparatus is capable of being a control node (e.g., an in-X AP) for the subnetwork. The first message may further indicate that the apparatus requests to create the subnetwork. The transmission of the first message may not depend on any other steps of some embodiments and it is transmitted as capability information to the network. The network can decide how to communicate with the apparatus and resource allocation, e.g., the resource of radio network identity.

In some embodiments, the method 500 may further comprise obtaining a subnetwork configuration information, wherein the subnetwork configuration information indicates the radio network identity and/or the PSI. In case that the subnetwork configuration information indicates the PSI, the apparatus may obtain the PSI directly from the message. In a special case, the radio access identity may be same as the PSI.

In some embodiments, the one or more subnetwork signals comprise a synchronization signal, SS, and/or a physical broadcast channel, PBCH. The method 500 may further comprise transmitting the SS and/or the PBCH within the subnetwork.

Figure 6:
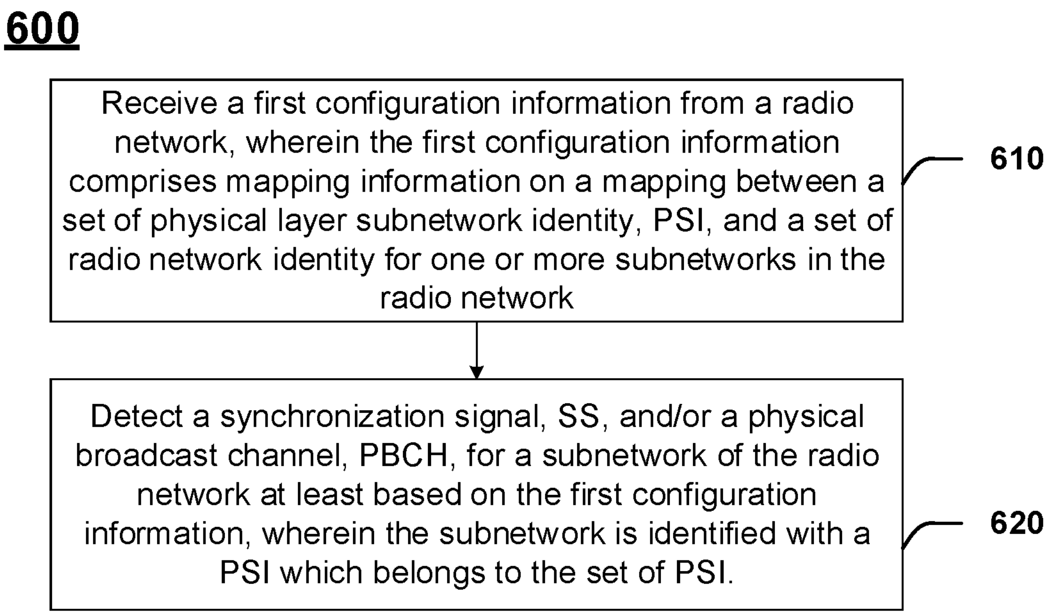
FIG. 6 is a flow chart depicting a method according to an embodiment of the present disclosure.

FIG. 6 is a flow chart depicting a method 600 according to an embodiment of the present disclosure. The method 600 can be implemented at any suitable device. For example, the method 600 can be implemented at a second apparatus, which is configured to implement the UE 122, in-X devices 322 as shown in FIGS. 1 and 3.

As shown at block 610, the method 600 comprises receiving a first configuration information from a radio network (e.g., from BS 111, 311). The first configuration information comprises mapping information of a mapping between a set of physical layer subnetwork identities, PSIs, and a set of radio network identities for one or more subnetworks in the radio network. At block 620, the method 600 comprises detecting a synchronization signal, SS, and/or a physical broadcast channel, PBCH, for a subnetwork (such as a subnetwork 120) of the radio network at least based on the first configuration information, wherein the subnetwork is identified with a PSI which belongs to the set of PSIs.

In some embodiments, the detecting may comprises determining a space of blind searching for the SS and/or PBCH, at least based on the first configuration information.

In some embodiments, the method 600 may further comprise accessing the subnetwork at least according to the detected SS and/or PBCH.

Figure 7:
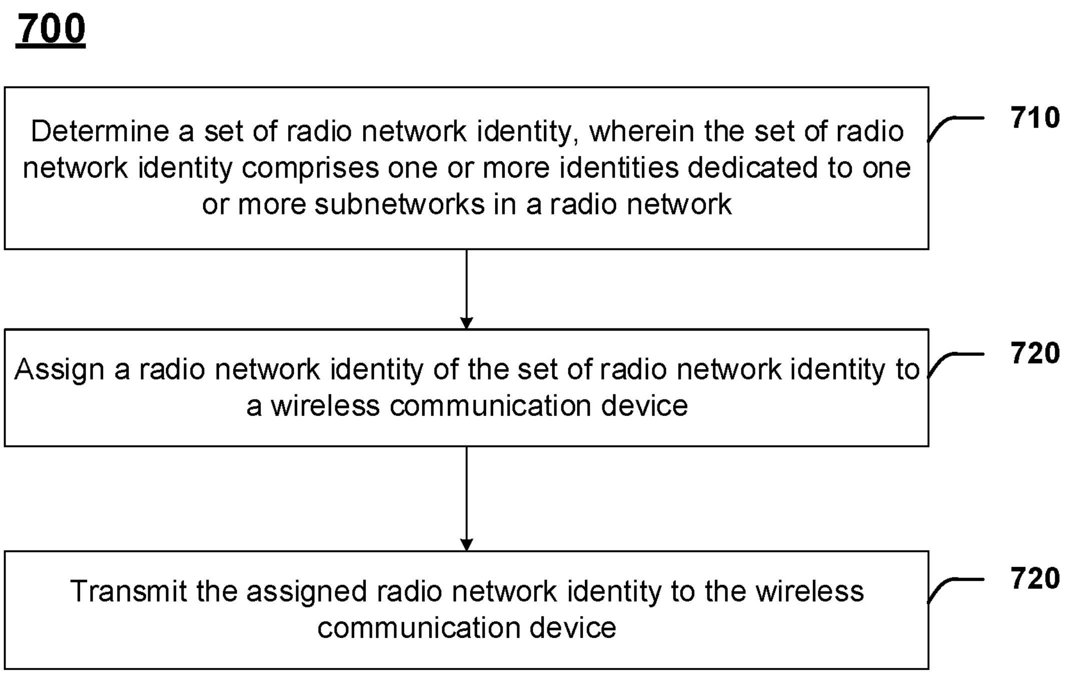
FIG. 7 is a flow chart depicting a method according to an embodiment of the present disclosure.

FIG. 7 is a flow chart depicting a method 700 according to an embodiment of the present disclosure. The method 700 can be implemented at any suitable device. For example, the method 700 can be implemented at a third apparatus, which is configured to implement the BS 111, BS 311 as shown in FIGS. 1 and 3.

As shown at block 710, the method 700 comprises determining a set of radio network identities, wherein the set of radio network identities comprises one or more identities dedicated to one or more subnetworks in a radio network. At block 720, the method 700 comprises assigning a radio network identity of the set of radio network identities to a wireless communication device (such as the in-X AP 121, in-X AP 321). At block 720, the method 700 comprises transmitting the assigned radio network identity to the wireless communication device.

The method 700 may further comprise transmitting a first configuration information to the wireless communication device. The first configuration information comprises mapping information of a mapping between a set of physical layer subnetwork identities, PSIs, for the one or more subnetworks and the set of radio network identities. The first configuration information may be a transmitted via broadcast as a part of a system message (such as SIB) of the radio network The method 700 may further comprise receiving a first message from the wireless communication device. The first message indicates the wireless communication device is capable of being a control node for the subnetwork and that the apparatus requests to create the subnetwork.

In some embodiments, the method 700 may further comprise transmitting subnetwork configuration information to the wireless communication device, wherein the subnetwork configuration information indicates at least a PSI for a subnetwork.

Figure 8:
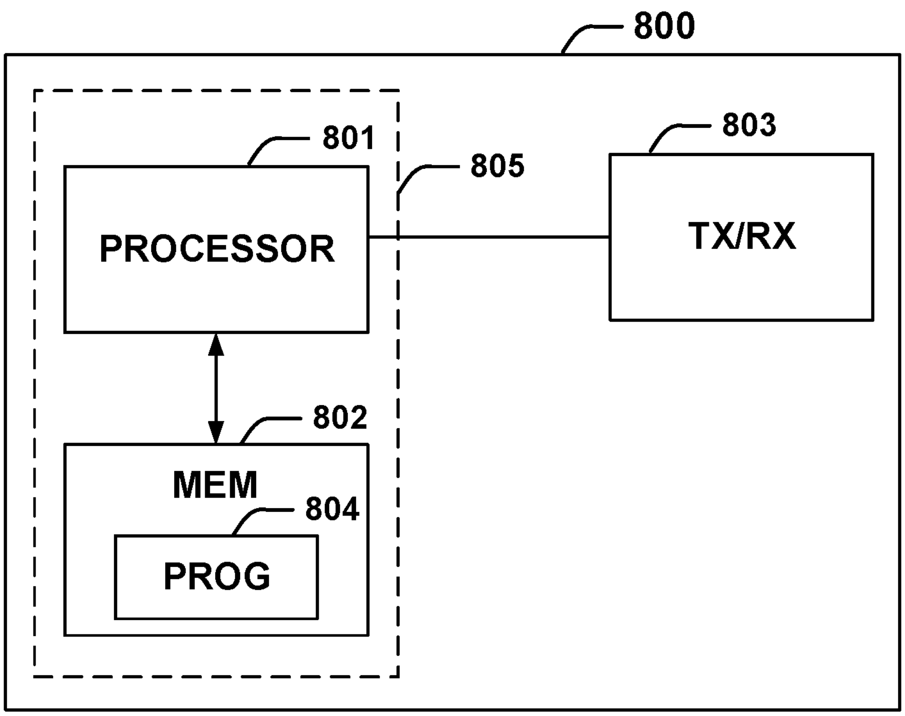
FIG. 8 shows a simplified block diagram of an apparatus according to an embodiment of the present disclosure.

Now reference is made to FIG. 8 illustrating a simplified block diagram of an apparatus 800 that may be embodied in/as a data processing device (such as in-X AP, in-X device and BS, shown in FIGS. 1 and 3). The apparatus 800 may comprise at least one processor 801, such as a data processor (DP) and at least one memory (MEM) 802 coupled to the at least one processor 801. The apparatus 800 may further comprise one or more transmitters TX, one or more receivers RX 803, or one or more transceivers coupled to the one or more processors 801 to communicate wirelessly and/or through wireline.

Although not shown, the apparatus 800 may have at least one communication interface, for example, the communicate interface can be at least one antenna, or transceiver as shown in the FIG. 8. The communication interface may represent any interface that is necessary for communication with other network elements.

The processors 801 may be of any type suitable to the local technical environment, and may include one or more of the following: general purpose computers, special purpose computers, microprocessors, digital signal processors (DSPs) and processors based on multicore processor architecture, as non-limiting examples.

The MEMs 802 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 802 stores a program (PROG) 804. The PROG 804 may include instructions that, when executed on the associated processor 801, enable the apparatus 800 to operate in accordance with the embodiments of the present disclosure, for example to perform one of the methods 500, 600 and 700. A combination of the at least one processor 801 and the at least one MEM 802 may form processing circuitry or means 805 adapted to implement various embodiments of the present disclosure.

Various embodiments of the present disclosure may be implemented by computer program executable by one or more of the processors 801, software, firmware, hardware or in a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. An apparatus for subnetwork operation, the apparatus comprising:

one or more processors; and one or more memories storing computer program codes, wherein when executed on the one or more processors, the computer program codes cause the apparatus to:

obtain a radio network identity which identifies the apparatus as a wireless communication device within a radio network;

obtain a physical layer subnetwork identity (PSI) at least based on the obtained radio network identity; and generate one or more subnetwork signals based on the obtained PSI, wherein the one or more subnetwork signals are used for intra-subnetwork communications within a subnetwork of the radio network.

2. The apparatus according to claim 1, wherein when executed on the one or more processors, the computer program codes further cause the apparatus to obtain the radio network identity by, obtaining the radio network identity from a set of radio network identities, wherein the set of radio network identities comprises one or more identities dedicated to one or more subnetworks in the radio network.

3. The apparatus according to claim 1, wherein when executed on the one or more processors, the computer program codes further cause the apparatus to:

obtain a first configuration information, wherein the first configuration information comprises mapping information of mapping between a set of PSIs and a set of radio network identities for one or more subnetworks in the radio network, and obtain the PSI by obtaining the PSI at least based on the radio network identity and/or the first configuration information.

4. The apparatus according to claim 3, wherein the mapping information indicates at least one of:

a minimum identity in the set of radio network identities, a maximum identity in the set of radio network identities, or a number of identities to be allocated for the set of PSIs.

5. The apparatus according to claim 3, wherein the set of PSIs is a default set of PSIs.

6. The apparatus according to claim 1, wherein when executed on the one or more processors, the computer program codes further cause the apparatus to:

provide a first message to the radio network, wherein the first message indicates that the apparatus is capable of being a control node for the subnetwork and that the apparatus requests to create the subnetwork.

7. The apparatus according to claim 1, wherein when executed on the one or more processors, the computer program codes further cause the apparatus to:

obtain a subnetwork configuration information, wherein the subnetwork configuration information indicates the radio network identity and/or the PSI.

8. The apparatus according to claim 1, wherein the one or more subnetwork signals comprise a synchronization signal (SS) and/or a physical broadcast channel (PBCH) and when executed on the one or more processors, the computer program codes further cause the apparatus to:

provide the SS and/or the PBCH within the subnetwork.

* * * * *